Feb. 15, 1966 — J. R. KREGLO, JR — 3,234,778
DILATOMETER FOR HEATED SPECIMENS UNDER EXTERNAL STRESS
Filed Dec. 31, 1962 — 2 Sheets-Sheet 1

INVENTORS
James R. Kreglo Jr.

Feb. 15, 1966   J. R. KREGLO, JR   3,234,778
DILATOMETER FOR HEATED SPECIMENS UNDER EXTERNAL STRESS
Filed Dec. 31, 1962   2 Sheets-Sheet 2

INVENTORS
James R. Kreglo Jr.

United States Patent Office 3,234,778
Patented Feb. 15, 1966

3,234,778
DILATOMETER FOR HEATED SPECIMENS UNDER EXTERNAL STRESS
James R. Kreglo, Jr., Bethlehem, Pa., assignor, by mesne assignments, to Bethlehem Steel Corporation, a corporation of Delaware
Filed Dec. 31, 1962, Ser. No. 248,432
5 Claims. (Cl. 73—15.6)

This invention relates to a dilatometer for measuring dimensional changes in a test specimen. More specifically it is directed to an instrument which measures dimensional changes in a test specimen subjected to a load at elevated temperature, while at the same time eliminating errors caused by equipment expansion at said elevated temperatures.

It is an object of the present invention to provide a dilatometer to accurately measure dimensional changes in test specimens when subjected to load at high temperature.

Another object is to provide a dilatometer of specified construction that can be utilized on test specimens of various dimensions.

Another object is to provide an instrument of the above class which will be applicable to the testing of specimens in simple furnaces of various sizes.

It is a further object to provide an apparatus to accurately measure dimensional changes in test specimens wherein means are provided for minimizing errors due to thermal expansion within the apparatus itself. Other objects and advantages of this invention will be apparent from the following specification and the accompanying drawings, in which FIG. 1 is an isometric view, partly cross sectional, of apparatus embodying this invention.

Figure 1:
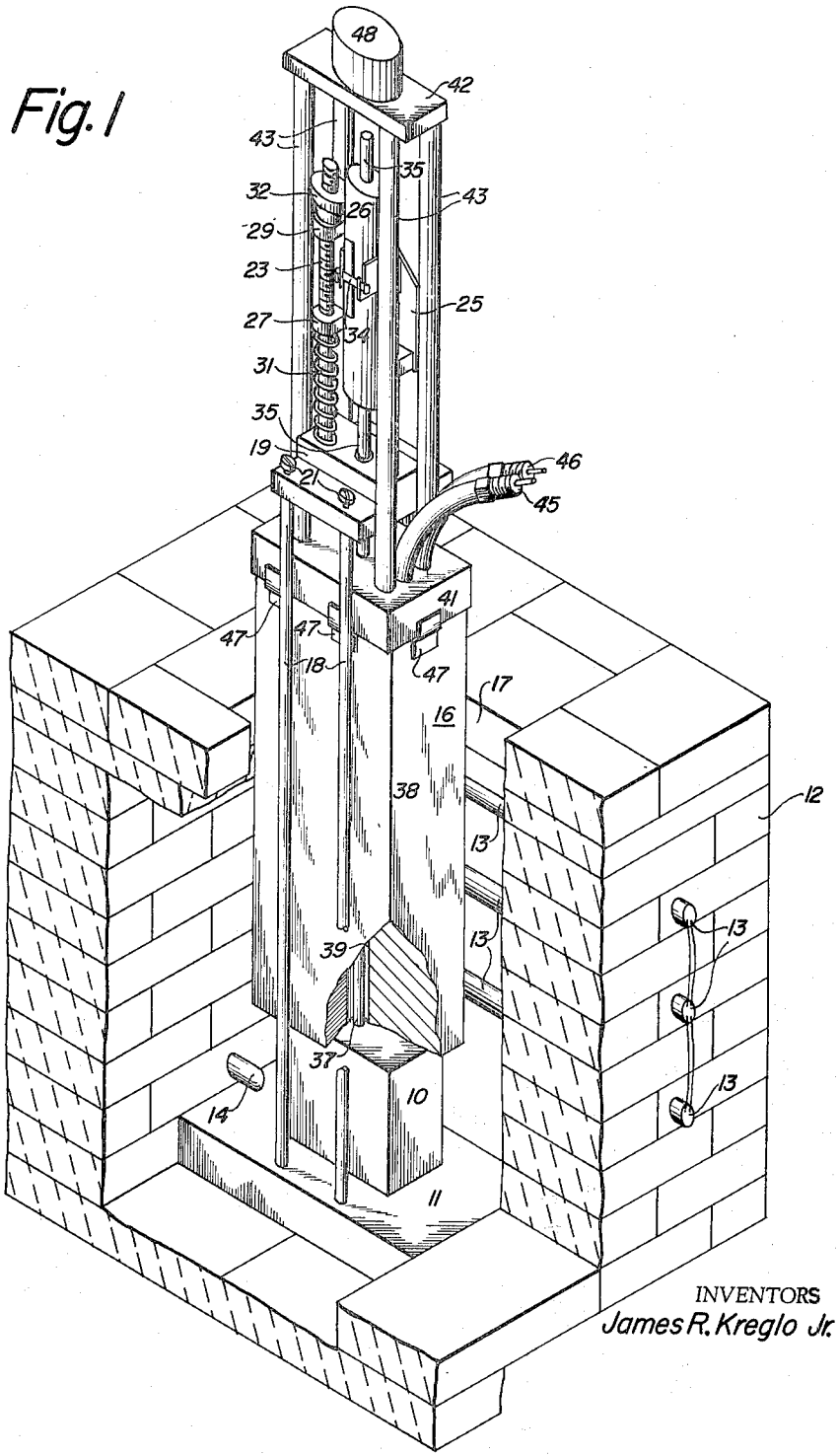
Figure 2:
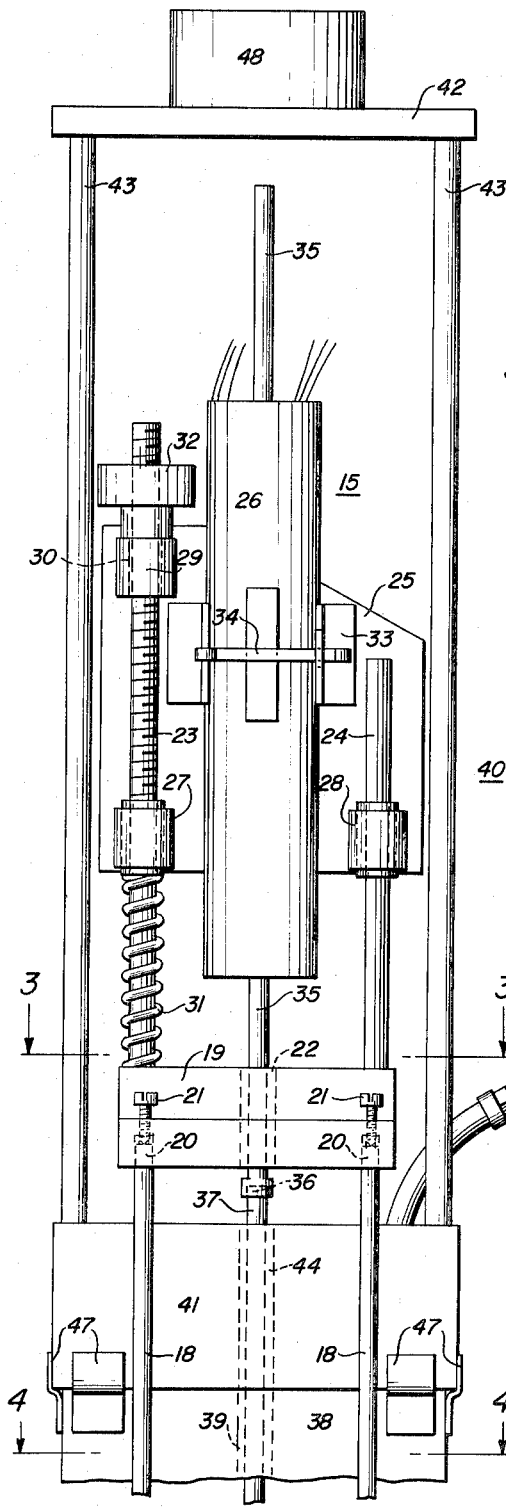
FIG. 2 is an elevation of that portion of the apparatus of FIG. 1 that projects above the furnace.
Figure 3:
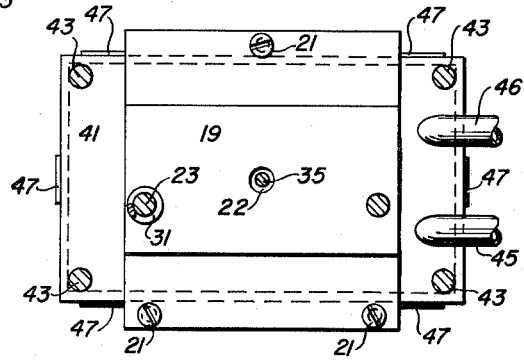
FIG. 3 is a sectional view taken on the line 3—3 of FIG. 2.
Figure 4:
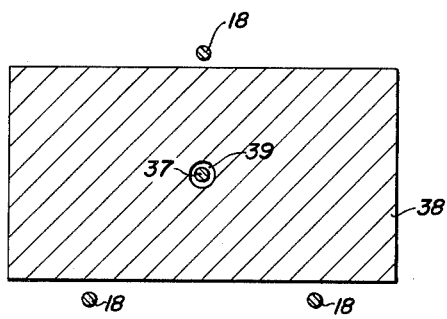
FIG. 4 is a sectional view taken on the line 4—4 of FIG. 2.

Referring now to the drawings in detail:

A specimen 10, to be investigated, is placed preferably in a vertical position, on a flat and level hearth floor 11 of a furnace 12 having electrical heating elements 13 adapted to be supplied with electrical energy from a source not shown, whereby the specimen may be heated through any desired range of temperatures. Furnace 12 can be of any conventional construction, and in the instant case is formed of firebrick with a mullite lintel. This particular construction is quite simple and adaptable to the examination of numerous test samples without any elaborate change in furnace structure. A thermocouple 14 may be used to measure the furnace temperature and to signal a cam operated program control, not shown, which automatically governs the heating cycle to which the specimen is exposed.

The test apparatus of the present invention may be divided into two parts, the measuring means 15 and the loading mechanism 16. The apparatus passes through an opening 17 in the roof of the furnace. When more than one specimen is being tested the furnace is easily enlarged and additional openings made for the required number of test apparatuses.

Measuring means 15 has legs 18 which pass through opening 17 in the top of furnace 12 and rest on the hearth floor 11 straddling test specimen 10. The legs 18 may be made from any material resistant to high temperatures and having a low uniform coefficient of expansion. The specific embodiment of the invention illustrated has three legs 18 comprising sapphire rods sufficiently long to project above the top of the furnace 12 and support a base block 19, preferably made of nonmagnetic material. The legs 18 are set in sockets 20 on the underside of block 19, and, to adjust its level, set screws 21 are located directly above each socket 20. A vertical hole 22 is located in the center of block 19. Mounted on the upper side of plate 19 are two upright guideposts 23 and 24, guidepost 23 having its upper half threaded, these guideposts supporting a mounting plate 25 for a differential transformer 26. Two antifriction bushings 27 and 28 on the plate 25 permit it to be adjusted vertically on the guideposts 23 and 24. Near the top of plate 25 is stop block 29 having a center hole 30, somewhat larger in diameter than that of guidepost 23, in line with bushing 27 below it. A spring 31 is located on the lower end of threaded post 23 and at its upper end is adjusting nut 32. Thus, mounting plate 25 is held firmly in place by spring 31 compressed on guidepost 23 between mounting block 19 and bushing 27 and the action of the adjusting nut 32 against stop block 29. Transformer 26 is secured to mounting plate 25 by an open clamp 33 with a pivoting quick release closing clip 34.

The differential transformer 26 is an electromechanical transducer that produces an A.C. voltage output proportional to the displacement of its internal armature, not shown, from the electrical center. The armature is guided in the transformer by armature rod 35, preferably stainless steel, which passes longitudinally through its center. Rod 35 has a small socket 36 in its upset lower end. The lower portion of rod 35 passes freely through the centered hole 22 in the base block 19, and socket 36 fits around the upper end of a probe 37, preferably made of the same heat resistant material as the legs 18. Probe 37 is sufficiently long to extend from its point of contact with rod 35 to a point of contact with the top of test specimen 10. Thus, any deformation of the test specimen causes probe 37 to rise or fall. Armature rod 35, in contact with the upper end of probe 37, moves a corresponding distance causing a displacement of the armature from its electrical center and producing a voltage output proportional to the displacement.

A servo-recorder, not shown, translates to units of linear measure the signals from differential transformer 26. By turning adjusting nut 32, mounting plate 25 can be raised or lowered to set the armature of differential transformer 26 on electrical center to zero the recorder, or transformer 26 can be positioned to record its initial output at any preselected point of the recorder range. This adjustment is also useful when multiple specimen testing necessitates spreading the points for ease of reading. In working with the apparatus of our invention, a center-scale-zero recorder, with a dual range of plus and minus 0.5 inch and plus and minus 0.05 inch from the midpoint may be used.

A fan, not shown, is normally directed across the differential transformer 26 to keep it cool and protect the instrument during use.

Load is transmitted to test specimen 10 by plunger 38 passing through opening 17 in the top of the furnace and having its lower end resting on specimen 10. Plunger 38 is formed of a heat resistant material with a high compressive strength, in this case silicon carbide. Plunger 38 should be of a material which will not chemically react with the material of the test specimen. Preferably the lower face of plunger 38 has an area equal to or greater than that of test specimen 10 on which it rests. The upper end of plunger 38 protrudes slightly above the furnace top and contains a centered longitudinal hole 39 through which probe 37 can move freely. A loading frame 40, independent of the measuring system, rests on top of plunger 38. Loading frame 40 is formed of lower plate 41, preferably water cooled, upper plate 42 and corner posts 43. Lower plate 41 has a center hole 44, in line with hole 22 of block 19 and hole 39 of plunger 38, which is sufficiently large to allow probe 37 to pass through without contact. On its top, plate 41 has inlet and outlet water connections 45 and 46 and on its underside has brackets 47 to prevent plunger 38 from shifting position and breaking probe 37 in the event test specimen 10 fails unevenly under load. A calibrated load 48 is applied to upper plate 42 of frame 40, and the load is transmitted to the test specimen by plunger 38. Thus the loading mechanism 16 consists of loading frame 40, plunger 38 and load 48. While a simple weight 48 is illustrated, numerous other means of applying a load to the test specimen can be utilized.

Operation of my invention is as follows: a test specimen 10 is placed on the floor 11 of electric furnace 12 and the apparatus arranged as indicated in FIG. 1. Opening 17 in the roof of furnace 12 permits plunger 38 and legs 18 to function without interference from the roof structure. The armature of differential transformer 26 is set on electrical center and the recorder is set at a zero reading by adjustment of nut 32. Frame 40 is loaded as desired. The bricks forming the top of furnace 12 are moved into position and opening 17 enclosed by insulation which is positioned to avoid interference with plunger 38 and legs 18. Current is supplied to heating elements 13 and specimen 10 subjected to the desired heating schedule.

During the test, any change in dimension of specimen 10, between the furnace floor 11 and plunger 38, will cause probe 37 resting thereon to rise or fall, depending upon the expansion or deformation of the specimen. Any change in position of probe 37 will cause a corresponding displacement of armature rod 35 from its electrical center, and differential transformer 26 will signal its servo recorder wherein the displacement will be transduced to units of linear measure on a chart.

Errors, caused by expansion and deformation of a furnace hearth or supporting structure, which normally occur in determining deformation of a test sample, subjected to high temperatures, are reduced to a minimum by the use of our invention. By supporting transformer 26 by means of legs 18 on floor 11 of furnace 12, and also supporting test specimen 10 on floor 11, any change in the furnace structure which would cause vertical movement of the specimen 10 would cause a corresponding movement of the transformer 26. Thus, the relative position of the top of test specimen 10 in relation to the electrical center of differential transformer 26, is influenced only by the deformation of specimen 10 brought about by the test conditions.

The apparatus of the present invention is easily constructed, simple to operate and adaptable to use in almost any type furnace structure. Where numerous specimens are to be tested it may be convenient to utilize two or more units, as described above, and have them connected to the same recording unit. The apparatus may be modified by using a dial gauge in place of the differential transformer and the lineal deformation of the test specimen for any particular temperature read directly from the dial. In the event the specimen is to be tested without any load placed on it, the measuring means can be utilized separately.

Generally, when testing for deformation, as mentioned above, the test specimen is placed on the hearth floor, but other means of support can be employed. For instance, in bar deformation studies the specimens are placed on knife edge supports resting on the hearth floor, and the probe rests on the top of the specimen midway between the supports.

It will be understood that various modifications and changes can be made in this invention without departing from the spirit of the invention or the scope of the appended claims.

I claim:
1. In a dilatometer, including a furnace, for measuring dimensional changes of a test specimen of solid material,
 (a) test specimen supporting means within said furnace,
 (b) a load transmitting plunger having its lower end bearing on said specimen,
 (c) said plunger having a vertical passage therethrough,
 (d) a loading frame mounted on said plunger comprising a lower plate and an upper plate held in parallel spaced apart relationship by supporting posts,
 (e) means for loading said upper plate,
 (f) a vertical hole in said lower plate in alignment with said plunger passage,
 (g) a plurality of legs resting on said specimen supporting means and projecting upwardly therefrom,
 (h) said legs straddling said specimen, plunger and loading frame lower plate,
 (i) a base block mounted on said legs,
 (j) said base block having a vertical aperture therethrough in alignment with said lower plate hole and plunger passage,
 (k) a measuring device adjustably secured to said base block,
 (l) a movable probe having its lower end in engagement with a test specimen and its upper end in engagement with said measuring device,
 (m) said probe passing freely through said plunger passage and lower plate hole, whereby the linear displacement of said probe actuates the measuring device.
2. In a dilatometer, including a furnace, for measuring dimensional changes of a test specimen of solid material
 (a) test specimen supporting means within said furnace,
 (b) a load transmitting plunger bearing on said specimen,
 (c) said plunger having a vertical passage therethrough,
 (d) a loading frame comprising a lower plate and an upper plate held in parallel spaced apart relationship by supporting posts,
 (e) means for loading said upper plate,
 (f) said lower plate mounted on said plunger,
 (g) a vertical hole in said lower plate in alignment with said plunger passage,
 (h) a plurality of legs resting on said specimen supporting means and projecting upwardly therefrom,
 (i) said legs straddling said specimen, plunger and loading frame lower plate,
 (j) a base block mounted on said legs,
 (k) said base block having a vertical aperture therethrough in alignment with said lower plate hole and plunger passage,
 (l) a movable probe having its lower end in engagement with a test specimen and its upper end projecting above said lower plate,
 (m) said probe passing freely through said plunger passage and lower plate hole,
 (n) a differential transformer mounted on said base block,
 (o) said transformer having a moving element with its lower end freely passing through said base block aperture,
 (p) said transformer element having its lower end in engagement with the top end of said movable probe whereby the linear displacement of the probe causes a corresponding displacement of said transformer element from its electrical center producing a voltage output proportional to the displacement.
3. A dilatometer for measuring dimensional changes, under heat and pressure, of a test specimen supported on a base within a furnace, comprising:
 (a) at least three upwardly extending legs adapted to straddle the specimen and to rest on said base,
 (b) a measuring device mounted above and connected to the upper end of said legs,

(c) a probe extending downwardly from said measuring device and adapted to engage the specimen,
(d) load-transmitting means in axial alignment with said probe adapted to rest on said specimen and extend upwardly therefrom,
(e) said load-transmitting means being out of contact with said probe, said legs and said measuring device,
(f) means for loading said load-transmitting means.

4. In a dilatometer, for measuring dimensional changes of a test specimen supported on a base within a furnace
(a) a plurality of legs resting on said base and straddling said specimen and extending upwardly therefrom and above the top of the furnace,
(b) a measuring device mounted above and connected to the upper end of said legs,
(c) a probe having its lower end in engagement with said specimen and its upper end in operative enengagement with said measuring device whereby linear displacement of the probe actuates the measuring device,
(d) separate load-transmitting means in axial alignment with said probe resting on said specimen and extending upwardly therefrom and above the top of the furnace,
(e) means for loading said load-transmitting means, in axial alignment with said probe exteriorly of said furnace.

5. In a dilatometer, for measuring dimensional changes of a test specimen supported on a base within a furnace
(a) a plurality of legs resting on said base and projecting upwardly therefrom,
(b) a base block mounted on said legs,
(c) a differential transformer secured to said base block,
(d) said transformer having a moving element,
(e) a movable probe,
(f) said probe having its lower end in engagement with a test specimen and its upper end in engagement with said transformer element whereby the linear displacement of the probe causes a corresponding displacement of said element from its electrical center producing a voltage output proportional to the displacement,
(g) separate load-transmitting means in axial alignment with said probe and resting on said specimen,
(h) means for loading said load-transmitting means, in axial alignment with said probe exteriorly of said furnace.

References Cited by the Examiner
UNITED STATES PATENTS

| | | | |
|---|---|---|---|
| 2,495,746 | 1/1950 | Lubin | 73—15.6 |
| 2,504,985 | 4/1950 | Kallas et al. | 73—15.6 |
| 2,732,708 | 1/1956 | Linhorst | 73—15.6 |
| 3,028,754 | 4/1962 | Huyser | 73—88.5 |

OTHER REFERENCES

Fulkerson: "Apparatus for Determining Linear Expansions of Materials in Vacuum or Controlled Atmosphere," ORNL–2856, Oak Ridge National Laboratory, Jan. 4, 1960, pages 8–13.

RICHARD C. QUEISSER, *Primary Examiner.*

JOSEPH P. STRIZAK, *Examiner.*